United States Patent [19]

Menke

[11] 4,388,609

[45] Jun. 14, 1983

[54] SIGNAL LIGHT WITH PRECESSING OSCILLATION CONTROL

[75] Inventor: W. Kenneth Menke, Glendale, Mo.

[73] Assignee: Public Safety Equipment Company, St. Louis, Mo.

[21] Appl. No.: 297,724

[22] Filed: Aug. 31, 1981

[51] Int. Cl.³ .............................................. B60Q 1/00
[52] U.S. Cl. ...................................... 340/84; 340/50; 340/49
[58] Field of Search ........................ 340/84, 50, 49, 28

[56] References Cited

U.S. PATENT DOCUMENTS

| | | |
|---|---|---|
| 2,221,483 | 11/1940 | Kennelly . |
| 2,409,046 | 10/1946 | Kennelly . |
| 2,417,934 | 3/1947 | Kennelly . |
| 2,510,892 | 6/1950 | Kennelly . |
| 2,607,838 | 8/1952 | McDowell ............................ 340/49 |
| 2,666,193 | 1/1954 | Keegan .................................. 340/49 |
| 2,677,121 | 4/1954 | Heehler ................................. 340/50 |
| 3,546,669 | 12/1970 | Kennelly ............................... 340/84 |
| 3,821,541 | 6/1974 | Burland . |

Primary Examiner—Donald J. Yusko
Attorney, Agent, or Firm—Senniger, Powers, Leavitt and Roedel

[57] ABSTRACT

A signal light comprising a base, a lamp frame pivoted on the base on a first axis, a lamp pivoted on the lamp frame on a second axis extending generally perpendicular to the first axis, a first electric motor for oscillating the lamp frame on the first axis generally at a first rate of oscillation, and a second electric motor for oscillating the lamp on the second axis at a second rate of oscillation. The ratio of the first and second rates of oscillation change during operation of the signal light due to drift in the output speed of one motor relative to the output speed of the other motor whereby on oscillation of the lamp frame and lamp about their respective axes the beam of light projected by the lamp traces a changing pattern.

27 Claims, 7 Drawing Figures

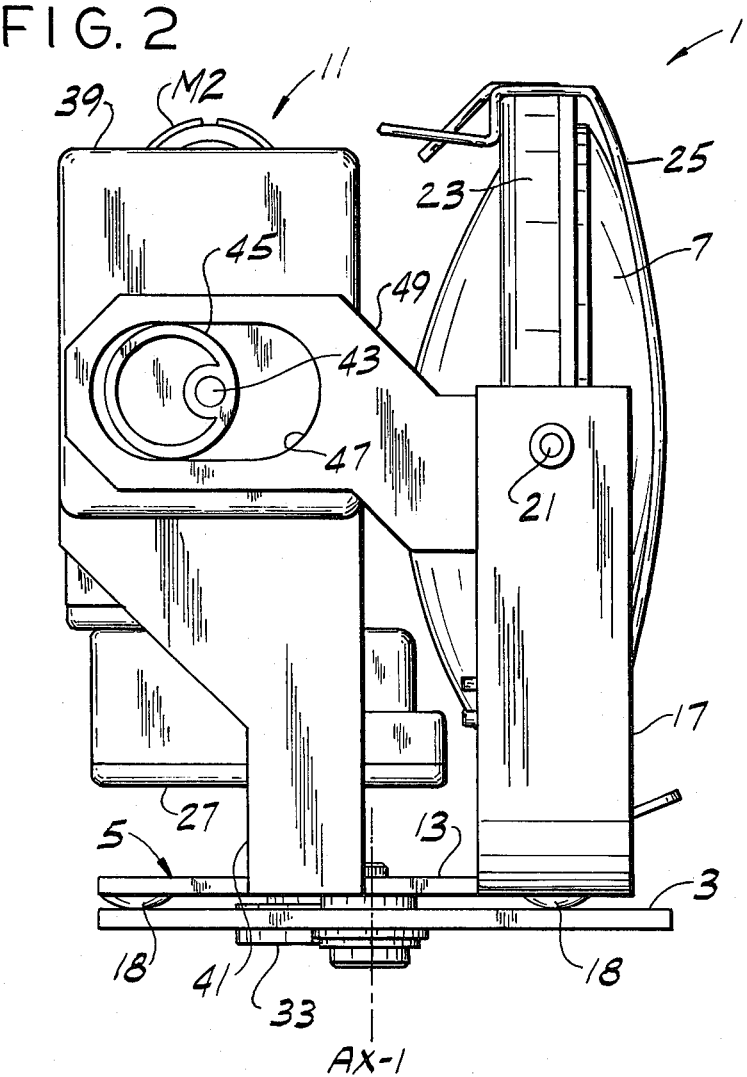

SIGNAL LIGHT WITH PRECESSING OSCILLATION CONTROL

BACKGROUND OF THE INVENTION

This invention relates generally to signalling devices for use on emergency vehicles, for example, and more particularly to a signal light of the type incorporating an oscillating lamp.

In signal lights of this type, the lamp is typically mounted for oscillation about two generally perpendicular axes (e.g., horizontal and vertical axes) for generating a beam of light repetitively movable through an unchanging predetermined path of travel, such as a Figure—8 pattern. However, conventional lights designed to trace beam pattern of this type are largely ineffective inasmuch as the beam fails to sweep all areas within the outer perimeter of the pattern, resulting in substantial gaps or blind spots in the pattern. Reference may be made to U.S. Pat. Nos. 2,221,483, 2,409,046, 2,417,934, 2,510,892, 2,677,121, 3,546,669 and 3,821,541 for signal devices generally in the field of this invention.

SUMMARY OF THE INVENTION

Among the several objects of this invention may be noted the provision of a signal light of the aforementioned oscillating type which is operable for projecting a beam of light and moving the beam through a relatively tight pattern in which the beam sweeps substantially all areas within the pattern; the provision of such a light which is durable in construction; and the provision of such a light which is of relatively simple design for economical manufacture.

Generally, a signal light of the present invention comprises a base, a lamp frame pivoted on the base on a first axis, a lamp pivoted on the lamp frame on a second axis extending generally perpendicular to the first axis, first drive means comprising a first electric motor for oscillating the lamp frame on the first axis generally at a first rate of oscillation, and second drive means comprising a second electric motor for oscillating the lamp on the second axis at a second rate of oscillation. The ratio of the first rate of oscillation to the second rate of oscillation is adapted to change during operation of the signal light due to drift in the output speed of one motor relative to the output speed of the other motor whereby on oscillation of the lamp frame and lamp about their respective axes the beam of light projected by the lamp is adapted to trace a changing pattern.

Other objects and features will be in part apparent and in part pointed out hereinafter.

BRIEF DESCRIPTION OF THE DRAWINGS

FIG. 2 is a left side elevation of FIG. 1;

Corresponding reference characters indicate corresponding parts throughout the several views of the drawings.

DESCRIPTION OF THE PREFERRED EMBODIMENT

Figure 1:
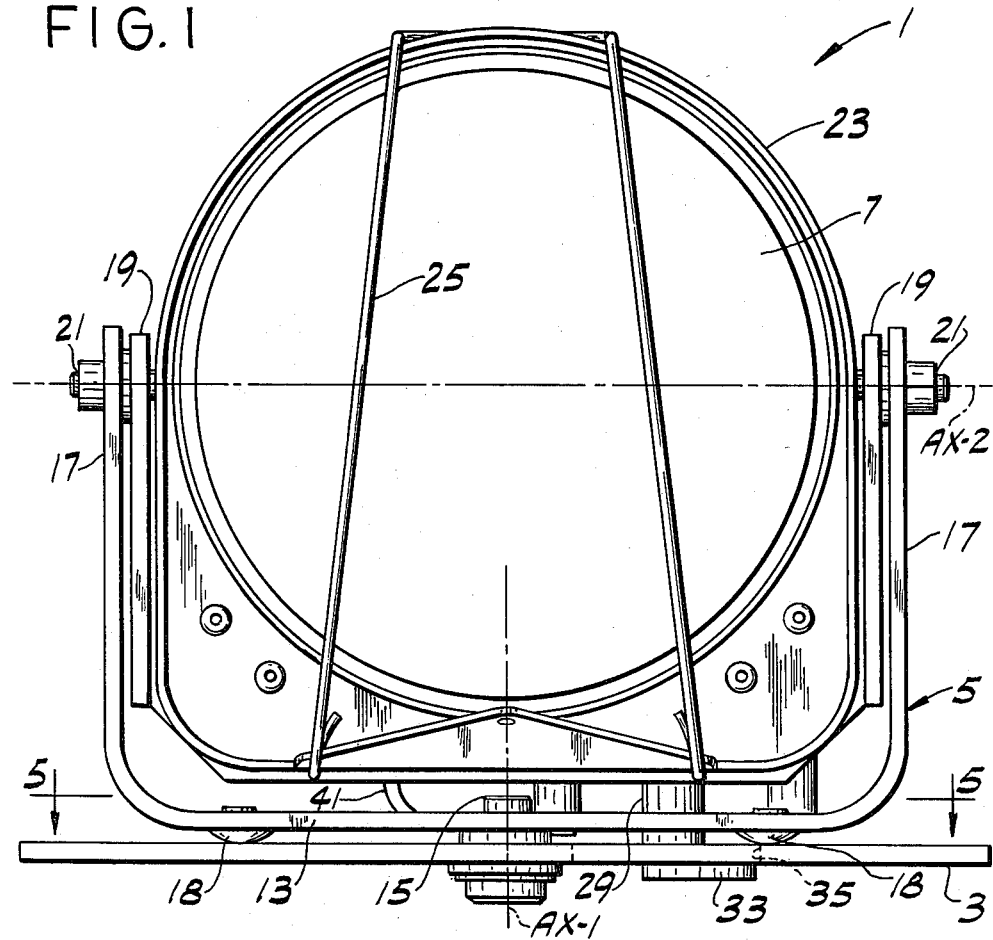
FIG. 1 is a front elevation of a signal lamp of the present invention.
Figure 3:
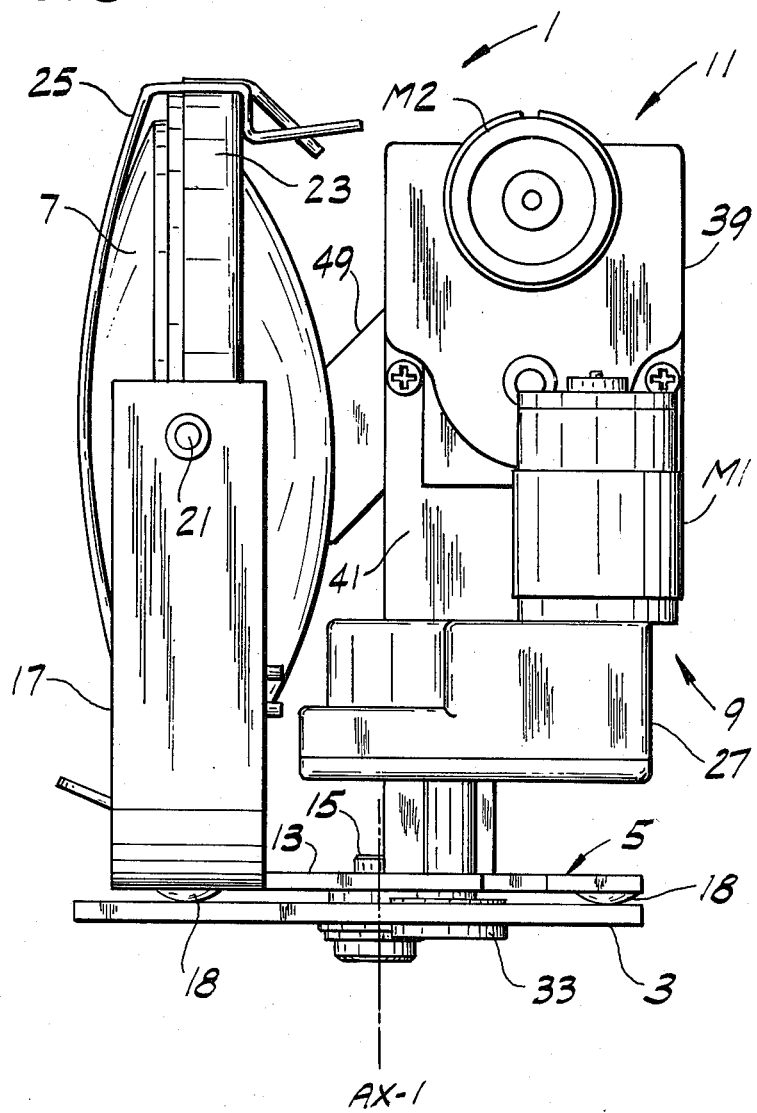
FIG. 3 is a right side elevation of FIG. 1.
Figure 4:
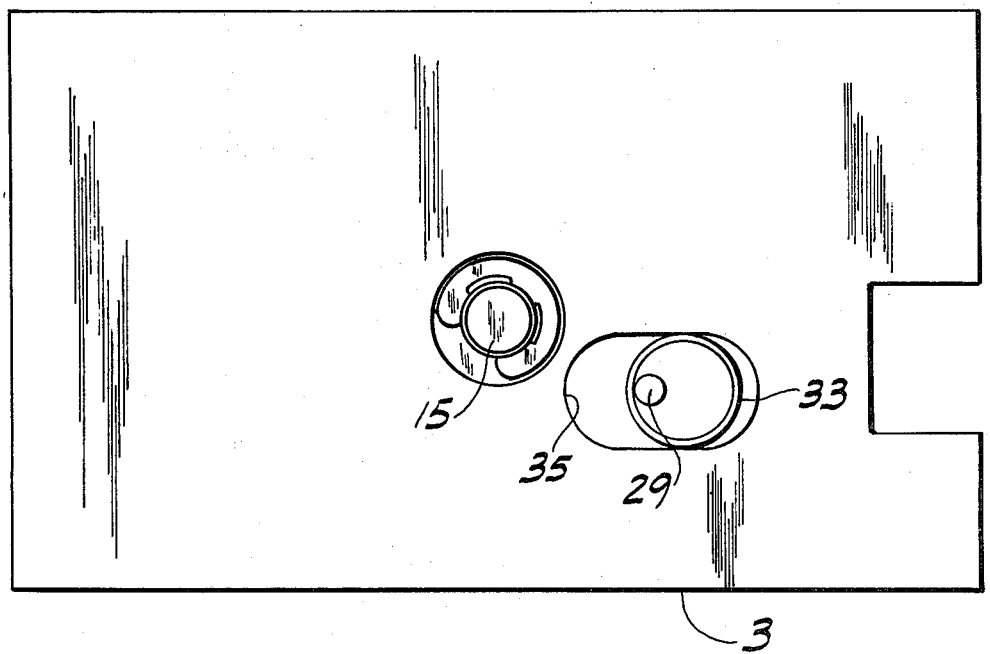
FIG. 4 is a bottom plan of FIG. 1.
Figure 5:
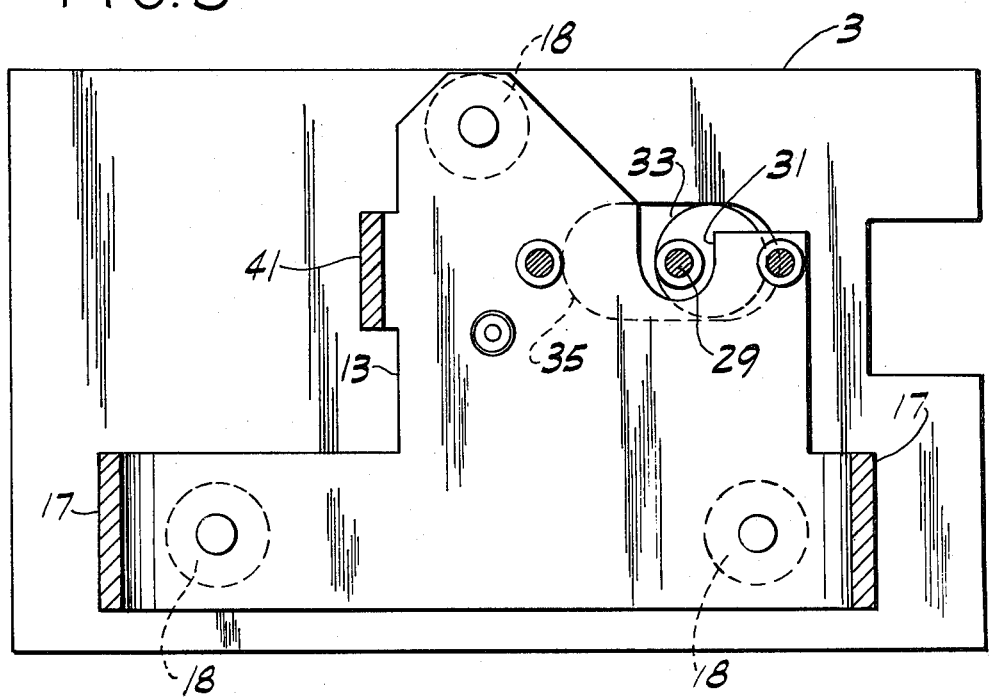
FIG. 5 is a horizontal section on line 5—5 of FIG. 1.

Referring now to the drawings, first more particularly to FIGS. 1-3, there is generally indicated at 1 a signal light of the present invention for use on emergency vehicles such as firetrucks and police cars. As shown, the light comprises a base constituted by a flat metal plate 3 which is adapted to be secured (e.g., bolted) to a suitable surface of the vehicle (such as the vehicle's roof) for mounting the light in a prominent position on the vehicle. A lamp frame, generally designated 5, is pivoted on the base 3 on a first axis AX-1, and a lamp 7 of the sealed beam type is pivoted on the lamp frame on a second axis AX-2 extending generally perpendicular to the first axis. With the base 3 secured to the vehicle in a generally horizontal position, axis AX-1 is a generally vertical axis and axis AX-2 is a generally horizontal axis. The signal light also includes first and second drive means, designated 9 and 11, respectively, on the lamp frame 5, the first drive means being operable for oscillating the lamp frame about the vertical axis AX-1 at a first rate of oscillation and the second drive means being operable for oscillating the lamp about the horizontal axis AX-2 at a second rate of oscillation. As will be explained more fully hereinafter, these rates of oscillation are different, but not substantially different, whereby the beam of light projected or thrown by the lamp traces a pattern in which the passes made by the beam sweep substantially all areas within the outer perimeter of the pattern. It will be understood that the parts of the signal light described above are mounted within a suitable enclosure of transparent weather-resistant material.

The lamp frame 5 comprises a horizontally disposed plate or flanged portion 13 which is spaced immediately above the base 3 and which has a pivot connection therewith as indicated at 15, and a pair of vertical arms 17 bent up from the flanged portion at opposite sides thereof at the front of the light. Bearings 18 on the bottom of the flanged portion 13 of the frame space the frame from the base 3. A subframe 19 carrying the lamp 7 is trunnion-mounted as indicated at 21 to these arms for pivoting about the horizontal axis AX-2. The lamp itself is received within a mounting ring 23 on the subframe 19 and is removably held in position in the ring by a wire retainer 25 at the front of the lamp pivoted at its lower end to the bottom of the mounting ring and having an upper end which is bent for a snap-fit over the top of the ring. The lamp may be removed from the ring by lifting the upper end of the retainer to disengage it from the ring and then pivoting the retainer on its lower end outwardly away from the lamp.

The drive means 9 for oscillating the frame 5 about the vertical pivot axis AX-1 comprises an electric motor M1 mounted with its output shaft (not shown) generally vertical atop a gearbox 27 rigidly secured to the flanged portion 13 of the frame. The output shaft of the motor is engageable with suitable reduction gearing in the gearbox for powering a drive shaft 29 extending down from the gearbox through a notch 31 in the frame 5. The drive shaft is rotatable about a vertical axis which is generally parallel to but offset from the pivot axis AX-1. A circular cam 33 (constituting cam means) eccentrically mounted on the lower end of the shaft 29 is received in a slot 35 in the base plate 3 extending in side-to-side direction with respect to the plate. The width of the slot 35 is only slightly greater than the diameter of the cam so that on rotation of the drive shaft the cam is adapted to reciprocate in the slot thereby to effect oscillation of the lamp frame 5 about AX-1. The cam 33 is of a suitable material (e.g., nylon) having good toughness and wear resistance characteristics and a relatively low coefficient of friction.

The drive means 11 for oscillating the subframe 19, ring 23 and lamp 7 about the horizontal pivot axis AX-2 comprises a second electric motor M2 mounted with its output shaft (not shown) generally horizontal on a gearbox 39 rigidly secured on one side of an upright support 41 bent to extend up from one side (the left side as viewed from the front of the light) of the flanged portion 13 of the base. The output shaft of the motor M2 is engageable with suitable reduction gearing in the gearbox 39 for powering a second drive shaft 43 extending laterally outwardly from the gearbox. This drive shaft 43 is rotatable about a generally horizontal axis parallel to but offset (rearwardly and slightly upwardly) from pivot axis AX-2. A circular cam 45 substantially identical to the cam 33 on the shaft 29 of the first drive means 9 is eccentrically mounted at the outer end of shaft 43 and is received within a slot 47 in an arm 49 extending rearwardly from an arm 17 of the subframe 19. The slot 47 extends longitudinally of the arm 49 and has a width which is only slightly greater than the diameter of the cam 45 whereby on rotation of the drive shaft 43 the cam is adapted to reciprocate in the slot 47 thereby to pivot the arm and thus oscillate the subframe 19, ring 23 and lamp 7 as a unit about axis AX-2.

Figure 6:
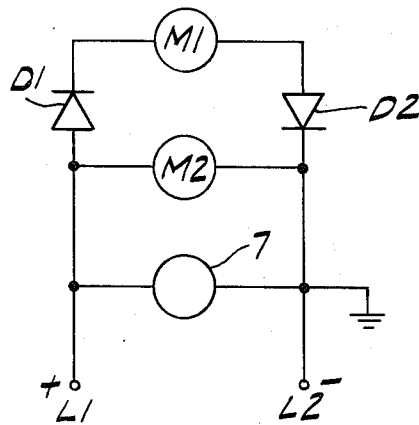
FIG. 6 is a circuit diagram of the signal light.

Both motors M1 and M2 are preferably direct-current motors connected for energization by a single power source, such as the 12-volt battery of an emergency vehicle. In the present embodiment, both motors have substantially identical full-voltage speeds. However, the circuitry of the signal light is such that M1 is operable at a slower speed than M2 to effect oscillation of the frame 5 about axis AX-1 at a rate of oscillation which is less than the rate at which the lamp 7 oscillates about axis AX-2. As illustrated in the circuit diagram of FIG. 6, motor M2 is connected in parallel with the series combination of motor M1 and a pair of diodes D1, D2 which function to reduce the voltage applied by the power source to motor M1 relative to motor M2 thereby to reduce the speed of motor M1 relative to the speed of motor M2. Assuming that the voltage applied by the power source to motor M2 is 12 volts and that each diode reduces the voltage applied to motor M1 by 0.5 volts, the total voltage applied to motor M1 will be 11 volts, and motor M1 will run at, for example, 11/12 the speed of motor M2. Therefore, assuming that the reduction gearing in the gearboxes 27, 39 is identical, the ratio of the rate of oscillation of the frame 5 about axis AX-1 to the rate of oscillation of the lamp 7 about axis AX-2 will also be about 11/12 or 0.92. It will be understood that this same ratio could be achieved without the use of diodes if the full-voltage speed of M1 were only 11/12 the speed of M2, or if both motors had the same full-voltage speed but the gearing in gearbox 39 provided only 11/12 the reduction provided by the gearing in gearbox 27. By varying the speeds of the motors relative one another and/or the gearing in one gearbox relative to the gearing in the other it is possible to obtain any desired ratio of oscillation rate. And, as discussed hereinbelow, the selection of the proper ratio is important.

Assuming that the rate at which the frame 5 oscillates about axis AX-1 and the rate at which the lamp 7 oscillates about axis AX-2 remain substantially constant, the lamp (and thus the beam emitted by the lamp) will follow a repetitive pattern of movement, the exact configuration of which will vary depending on the ratio of the oscillation rates about axes AX-1 and AX-2. Generally, where the ratio of the lesser of the two rates to the greater of the two rates is relatively high, the number of oscillations required to complete a pattern will be large, and the number of passes which the beam makes in scanning a target area will be correspondingly large. This ensures a certain thoroughness in that all portions of the target area are swept by the beam. However, more time is required to complete the pattern. Where the ratio is relatively low, the number of oscillations required to complete a pattern will be less, and the number of passes which the beam makes in scanning the area will, therefore, also be less. While the time required to complete a pattern of this type may be less, however, the number of passes made by the beam over the target area may be insufficient to cover all portions of the area, leaving blind spots. Thus, in selecting an ideal ratio of oscillation rates, there is a trade-off between the thoroughness of the scan and the time required to complete the scan.

Figure 7:
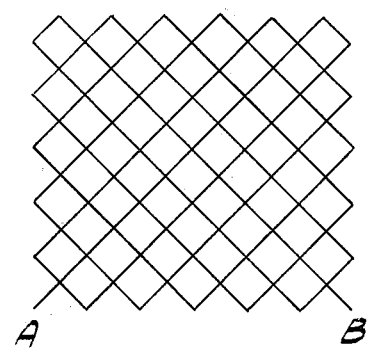
FIG. 7 is an idealized pattern followed by a beam of light generated by a signal lamp of this invention.

In accordance with the present invention, it has been found that the most effective scanning pattern from the standpoint of both time and thoroughness is achieved when the oscillation rates are different but not substantially different, and, more specifically, where the ratio of the lesser of the two rates to the greater of the two rates is in the range of 0.75–0.95. When the ratio is within this range, the pattern traced by the lamp as it oscillates about axes AX-1 and AX-2 is a pattern which ensures that the beam generated by the lamp sweeps virtually all areas within the target area in an acceptable period of time. When the ratio is less than about 0.75, the pattern traced by the beam becomes less effective in that portions of the target area are not swept by the beam. For example, when the ratio is 1 to 2 (i.e., 0.5), the beam traces a Figure—8 pattern, which is ineffective for illuminating a target area because of the large gaps or blind spots within the pattern, such as within the lobes of the 8. On the other hand, when the ratio is, for example, 0.92 (within the above-mentioned preferred range), the pattern traced by the beam is approximately the pattern shown in FIG. 7, wherein the passes made by the beam are relatively closely spaced over the entire pattern for ensuring beam coverage over the entire target area. It will be understood in this latter regard that the lines on the graph of FIG. 7 represent the path of but one point at the center of the beam as the beam moves through its pattern. An actual beam would have a height and width sufficient to cover the open spaces between the lines. In tracing the pattern, the beam starts at point A, proceeds to point B and then reverses itself and returns to point A. The pattern is then repeated. It will be noted that the FIG. 7 pattern appears to be a "moving" pattern rather than a stationary pattern because of the path travelled by the beam as it traces the pattern.

As the ratio of the two rates of oscillation approaches the lower end of the preferred range (0.75), the number of oscillations of the lamp required to complete the pattern, and thus the number of passes in the pattern, will decrease. At ratios less than about 0.75, the number of passes made in a pattern may be insufficient to cover all areas within the entire perimeter of the pattern. For ratios greater than about 0.95, the time required to trace a pattern becomes unacceptably high due to the large number of oscillations per pattern.

Due to various factors, such as heat, component age, etc., the output speed of an electric motor will "drift" or vary to a certain (albeit usually limited) extent during operation. The same is true for motors M1 and M2. As a result, the ratio of the rates of oscillation of the lamp on axes AX-1 and AX-2 will vary to a limited extent during operation of the signal lamp. Accordingly, the beam of light projected by the lamp will trace a changing pattern, which is advantageous in that this further ensures that all areas within a target area are swept by the beam.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A signal light comprising a base, a lamp frame pivoted on the base on a first axis, a lamp pivoted on the lamp frame on a second axis extending generally perpendicular to said first axis, first drive means comprising a first electric motor for oscillating the lamp frame on said first axis generally at a first rate of oscillation, and second drive means comprising a second electric motor for oscillating the lamp on said second axis at a second rate of oscillation, the ratio of said first rate of oscillation to said second rate of oscillation being adapted to change during operation of the signal light due to drift in the output speed of one motor relative to the output speed of the other motor whereby on oscillation of the lamp frame and lamp about their respective axes the beam of light projected by the lamp is adapted to trace a changing pattern.

2. A signal light as set forth in claim 1 wherein said second rate of oscillation is different from, but not substantially from, said first rate, the ratio of the lesser of the first and second rates to the greater of the two rates being in the range of 0.75–0.95 whereby on oscillation of the lamp frame and lamp about their respective axes the beam of light projected by the lamp is adapted to trace a pattern sweeping substantially all areas within the outer perimeter of the pattern.

3. A signal light as set forth in claim 2 wherein the first motor is operable at a first speed to effect oscillation of the lamp frame about said first axis at said first rate, and said second motor is operable at a second speed different from said first speed to effect oscillation of the lamp about said second axis at said second rate, the ratio of the lesser of the first and second speeds to the greater of the speeds being in the range of 0.75–0.95.

4. A signal light as set forth in claim 3 wherein said motors are direct-current motors connected for energization by a single power source.

5. A signal light as set forth in claim 4 wherein said motors have substantially identical full-voltage speeds but said first motor is operable at a speed less than that of the second motor, said signal light including means in series with the first motor for reducing the voltage applied by the power source to the first motor relative to the second motor thereby to reduce the speed of the first motor relative to the second motor.

6. A signal light as set forth in claim 5 wherein the second motor is in parallel with the series combination of the first motor and voltage-reducing means.

7. A signal light as set forth in claim 6 wherein the voltage-reducing means comprises a diode.

8. A signal light as set forth in claim 1 wherein said first and second motors are mounted on the lamp frame.

9. A signal light as set forth in claim 8 wherein said first drive means further comprises a drive shaft adapted, on energization of said first motor, for rotation about an axis generally parallel to but offset from said first axis, and cam means on the drive shaft engageable with the base on rotation of the drive shaft for oscillating the lamp frame about said first axis.

10. A signal light as set forth in claim 9 wherein said cam means comprises a circular cam eccentrically mounted on the drive shaft receivable in a slot in the base having a width not substantially greater than the diameter of the cam whereby on rotation of the drive shaft the cam is adapted to reciprocate in the slot thereby to effect said oscillation.

11. A signal light as set forth in claim 10 wherein said first drive means also includes gearing interconnecting the output shaft of the first motor and said drive shaft.

12. A signal light as set forth in claim 8 wherein said lamp is carried by a subframe pivoted on the lamp frame on said second axis, the subframe having an arm thereon for pivoting the subframe on said second axis, said second drive means comprising a drive shaft adapted, on energization of said second motor, for rotation about an axis generally parallel to but offset from said second axis, and cam means on the drive shaft engageable with said arm for pivoting the arm and thus said subframe thereby to oscillate the lamp about said second axis.

13. A signal light as set forth in claim 12 wherein said cam means comprises a circular cam eccentrically mounted on the drive shaft receivable in a slot in the arm having a width not substantially greater than the diameter of said cam whereby on rotation of the drive shaft said cam is adapted to reciprocate in the slot thereby to effect oscillation of the lamp about said second axis.

14. A signal light as set forth in claim 13 wherein said second drive means also includes gearing interconnecting the output shaft of said second motor and the drive shaft.

15. A signal light as set forth in claim 1 wherein said second rate of oscillation is greater than said first rate of oscillation.

16. A signal light comprising a base, a lamp frame pivoted on the base on a first axis, a lamp carried by a subframe pivoted on the lamp frame on a second axis extending generally perpendicular to said first axis, first drive means mounted on the lamp frame for oscillating the latter on said first axis at a first rate of oscillation, said first drive means comprising a first drive shaft rotatable about an axis generally parallel to but offset from said first axis, first cam means on the drive shaft, and a first electric motor for rotating the drive shaft and cam means thereon, said cam means being engageable with the base during said rotation for oscillating the lamp frame on said first axis, and second drive means mounted on the lamp frame for oscillating the subframe and lamp on said second axis at a second rate of oscillation, said second drive means comprising a second drive shaft rotatable about an axis generally parallel to but offset from said second axis, second cam means on the drive shaft, and a second electric motor for rotating the second drive shaft and second cam means thereon, said second cam means being engageable with the lamp subframe during said rotation for oscillating the subframe and lamp on said second axis at a second rate of oscillation.

17. A signal light as set forth in claim 16 wherein said first cam means comprises a circular cam eccentrically mounted on said first drive shaft receivable in a slot in the base having a width not substantially greater than the diameter of the cam whereby on rotation of the drive shaft the cam is adapted to reciprocate in the slot thereby to effect oscillation of the lamp frame about said first axis.

18. A signal light as set forth in claim 17 wherein said first drive means also includes gearing interconnecting the output shaft of the first motor and the first drive shaft.

19. A signal light as set forth in claim 16 wherein said subframe has an arm thereon for pivoting the subframe on said second axis, said second cam means comprising a circular cam eccentrically mounted on the second drive shaft receivable in a slot in the arm having a width not substantially greater than the diameter of said cam whereby on rotation of the drive shaft the cam is adapted to reciprocate in the slot thereby to effect oscillation of the lamp subframe about said second axis.

20. A signal light as set forth in claim 19 wherein said second drive means also includes gearing interconnecting the output shaft of the second motor and the second drive shaft.

21. A signal light comprising a base, a lamp frame pivoted on the base on a first axis, a lamp pivoted on the lamp frame on a second axis extending generally perpendicular to said first axis, means for oscillating the lamp frame on said first axis generally at a first rate of oscillation, and means for oscillating the lamp on said second axis at a second rate of oscillation different from, but not substantially different from, said first rate, the ratio of the lesser of the first and second rates to the greater of the two rates being in the range of 0.75–0.95 whereby on oscillation of the lamp frame and lamp about their respective axes the beam of light projected by the lamp is adapted to trace a pattern sweeping substantially all areas within the outer perimeter of the pattern.

22. A signal light as set forth in claim 21 wherein said means for oscillating the lamp frame on said first axis comprises a first electric motor and said means for oscillating the lamp on said second axis comprises a second electric motor, the ratio of said first rate of oscillation to said second rate of oscillation being adapted to change during operation of the signal light due to drift in the output speed of one motor relative to the output speed of the other motor whereby on oscillation of the lamp frame and lamp about their respective axes the beam of light projected by the lamp is adapted to trace a changing pattern.

23. A signal light as set forth in claim 22 wherein the first motor is operable at a first speed to effect oscillation of the lamp frame about said first axis at said first rate, and said second motor is operable at a second speed different from said first speed to effect oscillation of the lamp about said second axis at said second rate, the ratio of the lesser of the first and second speeds to the greater of the speeds being in the range of 0.75–0.95.

24. A signal light as set forth in claim 23 wherein said motors are direct-current motors connected for energization by a single power source.

25. A signal light as set forth in claim 24 wherein said motors have substantially identical full-voltage speeds but said first motor is operable at a speed less than that of the second motor, said signal light including means in series with the first motor for reducing the voltage applied by the power source to the first motor relative to the second motor thereby to reduce the speed of the first motor relative to the second motor.

26. A signal light as set forth in claim 25 wherein the second motor is in parallel with the series combination of the first motor and voltage-reducing means.

27. A signal light as set forth in claim 26 wherein the voltage-reducing means comprises a diode.

* * * * *